United States Patent Office 3,492,353
Patented Jan. 27, 1970

3,492,353
PREPARATION OF HIGHER MOLECULAR WEIGHT AMINES FROM 1-OLEFINS AND TRIMETHYLAMINE
James S. Dix, Bartlesville, Okla., assignor to Phillips Petroleum Company, a corporation of Delaware
No Drawing. Filed Nov. 29, 1965, Ser. No. 510,391
Int. Cl. C07c 85/00; B01j 1/10
U.S. Cl. 260—583                                    10 Claims

ABSTRACT OF THE DISCLOSURE

Higher molecular weight amines are prepared by the reaction of trimethylamine with at least one acyclic 1-olefin in the presence of a free radical initiator.

---

This invention relates to a process for the preparation of amines. In a specific aspect the invention relates to a process for the production of higher molecular weight amines from 1-olefins and trimethylamine.

It has been shown in the prior art that certain amines will react with acyclic 1-olefins in the presence of free radical initiators. However, the only tertiary amine tested which was found to give a successful addition reaction was N-methylpiperidine, and even then only trace yields of product were obtained. Triethylamine and tributylamine had been found to be unreactive for the production of higher molecular weight amines from 1-olefins. In accordance with the present invention, it has now been surprisingly found that not only will trimethylamine react with acyclic 1-olefins to produce higher molecular weight amines, but the product can be obtained in good yields.

Accordingly, it is an object of the invention to provide a new and improved process for the production of amines. Another object of the invention is to produce higher molecular weight amines from trimethylamine and acyclic 1-olefins in good yields. Other objects, aspects and advantages of the invention will be apparent from a study of the specification and the appended claims to the invention.

According to the process of this invention, higher molecular weight amines are prepared by the reaction of trimethylamine with at least one acyclic 1-olefin in the presence of a free radical initiator, including chemical initiators and actinic radiation. The resulting higher molecular weight tertiary amine products are useful as flotation agents, as anti-static agents, as cationic detergent intermediates, and the like.

In carrying out the process of this invention, trimethylamine is reacted with an acyclic mono-1-olefin. The acyclic mono-1-olefins which can be employed will usually contain from 2 to 24 carbon atoms. It is within the scope of this invention to utilize both branched and unbranched acyclic mono-1-olefins. Typical acyclic mono-1-olefins which can be employed are ethylene, propylene, 1-butene, 2-mthyl-1-butene, 1-hexene, 3-ethyl-1-hexene, 2,4,4-trimethyl-1-octene, 1-octene, 1-nonene, 1-dodecene, 8-methyl-1-tridecene, 10,10-diethyl-1-tridecene, 9-octyl-1-undecene, 1-eicosene, 1-tetraeicosene, and mixtures thereof.

The process of this invention is carried out at a temperature generally ranging from 25 to 250° C. in the presence of a free radical initiator. The free radical initiator can comprise a chemical source of free radicals, or actinic radiation can be employed. If a chemical free radical initiator is to be used, the chosen reaction temperature should be above the decomposition temperature of the chosen chemical initiator.

The reaction time can vary over a wide range, and will generally range from two minutes to ten days, but usually will be less than 100 hours. The mol ratio of acyclic 1-olefins/trimethylamine can also vary over a wide range, but will be at least 1/1 and can run 25/1 or even higher. The process can be effected in the presence or absence of a diluent. Suitable diluents include materials which are compatible with the reactants and the product amines, and which also do not interfere with the initiation of chain transfer reaction occurring in this process. It is preferred to employ diluents which will not yield a hydrogen atom to a proton abstracting radical. Some examples of compounds which can be employed, if desired, as diluents are benzene, cyclohexane and tert-butyl alcohol. The amines prepared according to the process of this invention can be recovered from the reaction mixture by conventional processes such as extraction, distillation, crystallization, and the like.

The amines prepared according to the process of this invention, wherein 1-olefins are contacted under reaction conditions with trimethylamine, have the general formula:

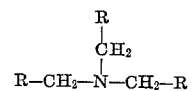

wherein, depending upon the specific olefins used, the ratio of reactants, and the extent of reaction, R can be either hydrogen or a hydrocarbon radical, at least one R being such a hydrocarbon radical. Under the reaction conditions of the invention, the hydrocarbon radical on the final amine product can be larger than the original 1-olefin reactant.

The free radical initiators which can be employed in the process of this invention include such chemical free radical initiators as peroxide compounds, organic azo compounds, and the like. Representative peroxide compounds which can be used include dialkyl peroxides, for example di-tert-alkyl peroxides such as di-tert-butyl peroxide, and other peroxides such as alkyl hydroperoxides, alkyl peroxy esters, and the like. Suitable azo initiators which can be used include those having an acyclic azo group, —N=N—, bonded to various non-aromatic, i.e., aliphatic or cycloaliphatic groups, at least one of which is tertiary. A typical initiator of the azo type is α,α'-azodiisobutyronitrile and others such as those disclosed in U.S. Patents 2,471,959, 2,492,763 and 2,503,253.

The actinic radiation which can be used as a free radical initiator in the process of this invention will generally have a potential or energy level in the range of 3.1 to 1×10⁸ electron volts. The radiation dose rate will generally be from 10³ to 10⁷ roentgens equivalent physical per hour (rep/hour), and the total radiation dosage will generally be from 10⁵ to 10¹¹ reps, preferably 10⁷ to 10⁹ reps. Lower radiation rates can be used but are not practical from a time standpoint, since the rate of reaction will be correspondingly low, and higher rates, while useable, are difficult to attain and are not necessary in the process of this invention. The radiation dosages and rates specified herein are internal, and the actual dosages are those received by the reaction system.

Actinic radiation used in the process of this invention includes actinic rays such as ultraviolet rays having a wave length in the range of 100 to 3800 angstroms, and ionizing radiation such as alpha rays, beta rays, gamma rays, X-rays, deuterons, and the like. The ultraviolet rays can be supplied from lamps or other sources, while the ionizing radiation can be obtained from such electric devices as cathode ray tubes and various accelerators. The natural and artificial radioactive elements can be used as ionizing radiation sources if desired. Spent fuel elements from a nuclear reactor can be employed as a source, and this particular source is quite attractive from an economic standpoint.

The product amines of this invention are quite useful, as they can be used in plastics for prevention of buildup of static electricity. They are useful as intermediates in the synthesis of flotation agents and cationic detergents. In the preparation of flotation agents and cationic detergents, it is frequently desirable to effect quaternization with an alkyl halide.

The following specific examples are intended to illustrate the advantages of the process of this invention, but it is not intended that the invention be limited to the specific reactants and conditions used in these runs.

A run was carried out in which a mixture of amines was prepared, according to the process of this invention, by the reaction of trimethylamine with octene-1 in the presence of a free radical initiator.

EXAMPLE I

In this run, a 700 ml. stainless steel bomb was purged with nitrogen, and 56 grams of octene-1 was charged to the bomb. The bomb was then filled, purged 4 times by pressurizing to 125 p.s.i.g. with nitrogen and venting. The bomb was cooled, and 250 grams of trimethylamine was charged to the bomb. At this time, 3.8 grams of tert-butyl peroxide was pressured into the bomb, after which the contents of the bomb were heated to 122° C. After 27.5 hours at 120 to 124° C., an additional 2.9 grams of tert-butyl peroxide was charged, and after 26.5 hours at 120 to 124° C., 1.0 grams of the same peroxide was charged. The contents were maintained at 120 to 124° C. for 13 hours, after this final addition of peroxide, at which time the bomb was cooled to room temperature and vented through 2 ice-cooled traps. The total reaction time was 61 hours at 120 to 124° C., and a total of 7.7 grams of tert-butyl peroxide had been added intermittently during the run. A total of 0.5 gram of material, having the odor of octene-1, was recovered in the cold traps. The residual material in the bomb was then distilled through a 12-inch Vigreaux column, and 34.3 grams of unreacted octene-1 was recovered by this distillation. The conversion of octene-1, thus, was about 38.7%.

The residual material from the octene-1 separation was then fractionated at low pressure. The fractionation showed the presence of three amine products. Subsequent infrared examination and elemental analysis showed that the products of the run were as follows:

| Product | Batch yield, percent | Ultimate yield, percent |
|---|---|---|
| Dimethylnonylamine | 10.2 | 26.3 |
| (3-hexylundecyl)dimethylamine | 8.5 | 21.0 |
| (3,5-dihexyltridecyl)dimethylamine | 7.3 | 18.9 |

EXAMPLE II

The stainless steel bomb of Example I was charged with 6.6 grams of di-tert-butyl peroxide, pressured to 250 p.s.i.g. with nitrogen, vented, and then charged with 158 grams of trimethylamine. An ethylene cylinder was placed in a water bath, heated to 37° C. and then a charge line from the cylinder was attached to the stainless steel bomb. The bomb was then heated to 110° C. and ethylene was charged to the bomb at a rate to maintain a pressure of about 1150 p.s.i.g. The reaction was carried out for 51 hours at 110° C.

At the end of this time, a waxy high molecular weight amine product was recovered in the following manner. The bomb was vented at room temperature through an ice-cooled trap. The bomb was then opened and 74.0 grams of residual liquid was recovered. After distilling off the lower molecular weight material, 13.4 grams of high molecular weight, non-distillable product material was recovered. This material was found to contain 83.1 weight percent carbon, 14.5 weight percent hydrogen and 2.3 weight percent nitrogen. The measured molecular weight of this material was 457.

I claim:
1. A process for the preparation of higher molecular weight amines which comprises reacting trimethylamine and at least one acyclic 1-olefin in the presence of a free radical initiator to produce at least one amine having higher molecular weight than trimethylamine.
2. A process in accordance with claim 1 wherein said acyclic 1-olefin contains from 2 to 24 carbon atoms, and further comprising recovering as a product of the process at least one amine having higher molecular weight than trimethylamine.
3. A process in accordance with claim 1 wherein said free radical initiator is actinic radiation.
4. A process in accordance with claim 1 wherein said free radical initiator is selected from the group consisting of peroxide compounds and organic azo compounds.
5. A process in accordance with claim 1 wherein the reaction is carried out in the presence of a diluent at a temperature in the range of 25° C. to 250° C. for a time in the range of two minutes to ten days.
6. A process in accordance with claim 1 wherein the mol ratio of acyclic 1-olefin to trimethylamine is in the range of 1:1 to 25:1.
7. A process in accordance with claim 1 wherein the reaction is carried out in the presence of a diluent.
8. A process in accordance with claim 1 wherein said acyclic 1-olefin is octene-1 and said free radical initiator is di-tert-butyl peroxide.
9. An process in accordance with claim 1 wherein said acyclic 1-olefin is ethylene and said free radical initiator is di-tert-butyl peroxide.
10. A process in accordance with claim 2 wherein said free radical initiator is actinic radiation or a chemical source of free radicals selected from the group consisting of peroxide compounds and organic azo compounds, the reaction is carried out in the presence of a diluent at a temperature in the range of 25° C. to 250° C. for a time in the range of two minutes to ten days, and the mol ratio of acyclic 1-olefin to trimethylamine is in the range of 1:1 to 25:1.

References Cited

UNITED STATES PATENTS 2,772,271  11/1956  Urry _____ 260—583

OTHER REFERENCES

Urry et al., Jacs, vol. 80, p. 3322–3328, 1958.

CHARLES B. PARKER, Primary Examiner

RICHARD L. RAYMOND, Assistant Examiner

U.S. Cl. X.R.

204—158